(12) United States Patent  
Nestares et al.

(10) Patent No.: US 8,531,504 B2  
(45) Date of Patent: Sep. 10, 2013

(54) SYSTEM AND METHOD FOR 3D VIDEO STABILIZATION BY FUSING ORIENTATION SENSOR READINGS AND IMAGE ALIGNMENT ESTIMATES

(75) Inventors: Oscar Nestares, San Jose, CA (US); Yoram Gat, Palo Alto, CA (US); Horst W. Haussecker, Palo Alto, CA (US); Igor V. Kozintsev, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 493 days.

(21) Appl. No.: 12/888,712

(22) Filed: Sep. 23, 2010

(65) Prior Publication Data

US 2011/0304694 A1 Dec. 15, 2011

Related U.S. Application Data

(60) Provisional application No. 61/353,982, filed on Jun. 11, 2010.

(51) Int. Cl.
| | | |
|---|---|---|
| *H04N 13/02* | (2006.01) | |
| *H04N 5/228* | (2006.01) | |
| *G06K 9/46* | (2006.01) | |
| *G06K 9/66* | (2006.01) | |
| *G06K 9/40* | (2006.01) | |

(52) U.S. Cl.  
USPC ........... 348/46; 348/208.2; 382/190; 382/274

(58) Field of Classification Search  
None  
See application file for complete search history.

(56) References Cited

U.S. PATENT DOCUMENTS

| 6,278,466 B1 | 8/2001 | Chen |
| 6,473,462 B1 | 10/2002 | Chevance et al. |
| 6,665,423 B1 | 12/2003 | Mehrotra et al. |
| 6,798,897 B1 | 9/2004 | Rosenberg |
| 6,810,152 B2 | 10/2004 | Endo et al. |
| 7,292,261 B1 | 11/2007 | Teo |
| 7,548,659 B2 | 6/2009 | Ofek et al. |
| 7,558,405 B2 | 7/2009 | Tico et al. |
| 2003/0085992 A1 | 5/2003 | Arpa et al. |

(Continued)

FOREIGN PATENT DOCUMENTS

| EP | 1376471 A1 | 1/2004 |
| JP | 5-130646 A | 5/1993 |

(Continued)

OTHER PUBLICATIONS

Azuma, Ronald T., "A Survey of Augmented Reality", In Presence: Teleoperators and Virtual Environments, vol. 6(4), Aug. 1997, pp. 1-48.

(Continued)

*Primary Examiner* — Nhon Diep  
*Assistant Examiner* — Edemio Navas, Jr.  
(74) *Attorney, Agent, or Firm* — Garrett IP, LLC (57) ABSTRACT

Methods and systems to for generating high accuracy estimates of the 3D orientation of a camera within a global frame of reference. Orientation estimates may be produced from an image-based alignment method. Other orientation estimates may be taken from a camera-mounted orientation sensor. The alignment-derived estimates may be input to a high pass filter. The orientation estimates from the orientation sensor may be processed and input to a low pass filter. The outputs of the high pass and low pass filters are fused, producing a stabilized video sequence.

27 Claims, 5 Drawing Sheets

(56) References Cited

U.S. PATENT DOCUMENTS

| | | |
|---|---|---|
| 2005/0163348 A1 | 7/2005 | Chen |
| 2006/0017814 A1 | 1/2006 | Pinto et al. |
| 2006/0066728 A1 | 3/2006 | Batur |
| 2007/0091124 A1 | 4/2007 | Hasegawa et al. |
| 2007/0297695 A1* | 12/2007 | Aratani et al. ............... 382/284 |
| 2008/0112630 A1 | 5/2008 | Nestares et al. |
| 2008/0291201 A1 | 11/2008 | Lafon |
| 2009/0208062 A1 | 8/2009 | Sorek et al. |
| 2009/0309984 A1* | 12/2009 | Bourgain et al. .......... 348/208.4 |
| 2010/0011268 A1* | 1/2010 | Sinop et al. .................. 714/746 |
| 2010/0141761 A1 | 6/2010 | McCormack |
| 2010/0251101 A1 | 9/2010 | Haussecker et al. |

FOREIGN PATENT DOCUMENTS

| | | |
|---|---|---|
| JP | 2001-210757 A | 8/2001 |
| JP | 2002-209208 A | 7/2002 |
| JP | 2005-517253 A | 6/2005 |
| JP | 2007-164653 A | 6/2007 |
| WO | 2008/057841 A1 | 5/2008 |
| WO | 2008/073109 A | 6/2008 |

OTHER PUBLICATIONS

Baker, et al., "Lucas-Kanade 20 Years On: A Unifying Framework", International Journal of Computer Vision 56(3), 2004, pp. 221-255.

Barfield, et al., "Fundamentals of wearable computers and Augumented Reality", Lawrence Erlbaum Associates, Mahwah, NJ, 2001. 2 Pages. <http://www.questia.com/library/108196270/fundamentals-of-wearable-c . . . >.

Barron, et al., "System & Experiment: Performance of optical flow techniques", International Journal of Computer Vision, 12:1, 1994 pp. 43-77.

Bento, et al., "Sensor Fusion for Precise Autonomous Vehicle Navigation in Outdoor Semi-structured Environments", Proceedings of the 8th International, IEEE Conference on Intelligent Transportation Systems, Vienna, Austria, Sep. 13-16, 2005, pp. 245-250.

Bergen, et al., "Hierarchical model-based motion estimation", In Proceedings of Second European Cont. on Comp. Vis., Springer-Verlag, 1992, pp. 237-252.

Black, et al., "The robust estimation of multiple motions: Parametric and piecewise—smooth flow fields", Computer Vision and Image Understanding, vol. 63, No. 1, 1996, pp. 75-104.

Bouthemy, et al., "A Unified Approach to Shot Change Detection and Camera Motion Characterization", INRIA, Institut National De Recherche En Informatique Et En Automatique, N ° 3304, Theme 3, Oct. 1999, 20 Pages.

Budnikov, et al., "Providing Common I/O Clock for Wireless Distributed Platforms", In Proc. IEEE International Conference on Acoustics, Speech, and Signal Processing, vol. 3, ICASSP 2004, pp. 909-912.

Chai, et al., "3-D Motion and Structure Estimation Using Inertial Sensors and Computer Vision for Augmented Reality", Submitted to Presence: Teleoperators and Virtual Environments, 2002, pp. 1-40.

Chang, et al., "A Robust and Efficient video stabilization algorithm", IEEE, 2004, 4 Pages.

Chen, Brian X., "If You're Not Seeing Data, You're Not Seeing", Wired, Gadget Lab Blog, 4 Pages, Retrieved on Sep. 6, 2012 from <http://www.wired.com/gadgetlab/2009/08/augmented-reality>.

Uyttendaele, et al., "Image-Based Interactive Exploration of Real-World Environments", IEEE Computer Graphics and Applications, vol. 24, No. 3, May/Jun. 2004, pp. 52-63.

Dufaux, et al., "Efficient, Robust and Fast Global Motion Estimation for Video Coding", IEEE Transactions on Image Processing, vol. 9, No. 3, Mar. 2000, 15 pages.

Exchangeable image file format for digital still cameras: Exif Version 2.2, JEITA CP-3451, Technical Standardization Committee on AV & IT Storage Systems and Equipment, Apr. 2002, pp. 1-148.

Gat, et al., "Fusing image data with location and orientation sensor data streams for consumer video applications", Intel Labs, Intel Corporation, IEEE Computer Society Conference, 2010, 8 pages.

Gemeiner, et al., "Simultaneous Motion and Structure Estimation by Fusion of Inertial and Vision Data", The International Journal of Robotics Research, vol. 26, No. 6, Jun. 2007, pp. 591-605.

Hampel, et al., "Robust Statistics: The Approach Based on Influence Functions", CiteULike, Apr. 6, 2005, 2 Pages.

United Kingdom Search Report received for GB Patent application No. 1108768.1, mailed on Sep. 27, 2011, 6 pages.

Horn, et al., "Determining optical flow", Artificial Intelligence, 1981, pp. 185-203.

Hu, et al., "Novel Strategy of Motion Detection and Object Tracking Based on Robust Statistics", Journal of System Simulation, vol. 18, No. 2, Feb. 2006, pp. 439-443 and 1-11 pages of English Translation.

"Video Stabilizing for Digital Camera", 93 Pages. (English Abstract and Translation Attached).

International Search Report and Written Opinion Received for the PCT Application No. PCT/US2007/082894, mailed on Feb. 28, 2008, 10 pages.

Wei, et al., "New Robust Global Motion Estimation Approach Used in MPEG-4", State High-Tech Developments Plan of China, Revised Jul. 5, 2000, pp. 1-13.

Kalman, R. E., "A New Approach to Linear Filtering and Prediction Problems", Transactions of the ASME—Journal of Basic Engineering, 82 (Series D), 1960, 12 Pages.

Lobo, et al., "Inertial Sensed Ego-motion for 3D Vision", Journal of Robotic Systems, 21(1), 2004, pp. 3-12.

Lourakis, et al., "Efficient, causal camera tracking in unprepared environments", Computer Vision and Image Understanding, Academic Press, vol. 99, No. 2, Aug. 2005, pp. 259-290.

Lucas, et al., "An Iterative Image Registration Technique with an Application to Stereo Vision", In Proceedings of the International Joint Conference on Artificial Intelligence, 1981, pp. 674-679.

Matei, et al., "Estimation of Nonlinear Errors-in-Variables Models for Computer Vision Applications", IEEE Transactions on Pattern Analysis and Machine Intelligence, vol. 28, No. 10, Oct. 2006, pp. 1537-1552.

Nestares, et al., "Error-in-variables likelihood functions for motion estimation", In Proc. of the IEEE International Conference on Image Processing, ICIP 2003, 4 Pages.

Nestares, et al., "Likelihood Functions and Confidence Bounds for Total-Least-Squares Problems", IEEE Conference on Computer Vision and and Pattern Recognition, Hilton Head, vol. 1, 2000, 8 Pages.

Nestares, et al., "Probabilistic estimation of optical flow in multiple band-pass directional channels", Image Vision Comput., 19(6), 2001, 24 pages.

Nestares, et al., "Robust multiresolution alignment of MRI brain volumes", Magnetic Resonance in Medicine 43, 2000, pp. 705-715.

Nestares, et al., "Video stabilization to a global 3D frame of reference by fusing orientation sensor and image alignment data", Online Submission ID: 190, Category: Sensing—sensor fusion, 9th IEEE International Symposium, 2010, pp. 1-5.

Office Action Received for Chinese Patent application No. 201010154846.2, mailed on Sep. 9, 2011, 3 pages of Office Action and 3 pages of English Translation.

Office Action Received for Japanese Patent Application No. 2010-073982, mailed on Mar. 6, 2012, 2 pages of Office Action and 2 pages of English Translation.

Office Action Received for Japanese Patent Application No. 2010-073982, mailed on Nov. 1, 2011, 3 pages of Office Action and 4 pages of English Translation.

Office Action Received for Korean Patent Application No. 10-2011-56475, mailed on Jun. 28, 2012, 5 pages of Office Action and 5 pages of English Translation.

Irani, et al., "Recovery of Ego-Motion Using Region Alignment", IEEE Transactions on Pattern Analysis and Machine Intelligence, vol. 19, No. 3,, Mar. 1997, pp. 268-272.

Schall, et al., "Global Pose Estimation using Multi-Sensor Fusion for Outdoor Augmented Reality", In Symposium on Mixed and Augmented Reality, 2009, 10 Pages.

Shoemake, Ken "Animating rotation with quaternion curves", SIGGRAPH Comput. Graph., vol. 19, No. 3, 1985, pp. 245-254.

Simoncelli, Eero P., "Design of Multi-Dimensional Derivative Filters", In Proc. of the IEEE International Conference on Image Processing, Austin Texas, vol. 1, Nov. 1994, pp. 1-6.

Sutherland, Ivan E., "A head-mounted three dimensional display", Proceedings of the Dec. 9-11, 1968, Fall Joint Computer Conference, part I, New York, USA, 1968, ACM, 10 pages.

Snavely, et al., "Photo Tourism: Exploring Photo Collections in 3D", ACM Transactions on Graphics (SIGGRAPH Proceedings), 25(3), Jul. 31, 2006, 12 pages.

Snavely, et al., "Modeling the world from internet photo collections", International Journal of Computer Vision, Jan. 30, 2007, 22 pages.

Szeliski, Richard, "Image Alignment and Stitching: A Tutorial", Foundations and Trends in Computer Graphics and Vision, vol. 2, No. 1, 2006, pp. 1-104.

Thrun, Sebastian, "Probabilistic robotics", Magazine Communications of the ACM—Robots: intelligence, versatility, adaptivity, vol. 45, Issue 3, Mar. 2002, 6 Pages.

Torr, et al., "The Development and Comparison of Robust Methods for Estimating the Fundamental Matrix", International J. of Computer Vision, vol. 24, No. 3, Jan. 1997, pp. 271-300.

Tukey, John W., "Exploratory Data Analysis", Addison Wesley, Reading, Mass, 1977, pp. 5-23.

Office Action received for Korean Patent Application No. 10-2011-56475, mailed on Feb. 27, 2013, 5 pages of Office Action including 2 pages of English Translation.

Office Action received for Chinese Patent Application No. 201110155321.5, mailed on Apr. 1, 2013, 10 pages of Office Action including 6 pages of English Translation.

* cited by examiner

SYSTEM AND METHOD FOR 3D VIDEO STABILIZATION BY FUSING ORIENTATION SENSOR READINGS AND IMAGE ALIGNMENT ESTIMATES

This application claims the benefit of U.S. Provisional Application No. 61/353,982, filed Jun. 11, 2010.

This application is also related to U.S. application Ser. No. 11/558,131, filed Nov. 9, 2006, and to U.S. application Ser. No. 12/416,040, filed Mar. 31, 2009.

The above three applications are incorporated herein by reference in their entirety.

BACKGROUND

Estimating the 3D orientation of a camera in a video sequence within a global frame of reference is a problem that may occur when addressing video stabilization in a virtual three-dimensional (3D) environment, as well as in navigation and other applications. This task requires the input of one or more orientation sensors (e.g., gyroscope, accelerometer, and/or compass) that may be attached to the camera to provide 3D orientation in a geographical frame of reference. However, high-frequency noise in the sensor readings may make it difficult to achieve the accurate orientation estimates that are required for visually stable presentation of a video sequence. This may be particularly true when the video is acquired with the camera as it undergoes high frequency orientation changes (i.e., jitter). Examples may include, for example, video shot from a moving car or while walking. Moreover, the quality of an orientation sensor can be a common problem in such contexts, especially for the low cost sensors available in consumer grade and cellphone cameras, leading to poor accuracy, especially in dynamic conditions. Typical values for angular root mean square (RMS) error may range from 0.5 to more than 2 degrees. Therefore such sensors may not measure camera jitter accurately, resulting in video sequences that may not show a stable scene when displayed in the context of a 3D environment.

On the other hand, image-based alignment has proven to be somewhat successful for image stabilization, providing accurate frame-to-frame orientation estimates. But image-based alignment may be prone to drifting over time due to error and bias accumulation and the lack of absolute orientation.

BRIEF DESCRIPTION OF THE DRAWINGS/FIGURES

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems for generating estimates of the 3D orientation of a camera within a global frame of reference. Orientation estimates may be produced from an image-based alignment method. Other orientation estimates may be taken from one or more camera-mounted orientation sensors. The alignment-derived estimates may be input to a high pass filter. The orientation estimates from the orientation sensor may be processed and input to a low pass filter. The outputs of the high pass and low pass filters may be fused, producing a stabilized video sequence.

Figure 1:
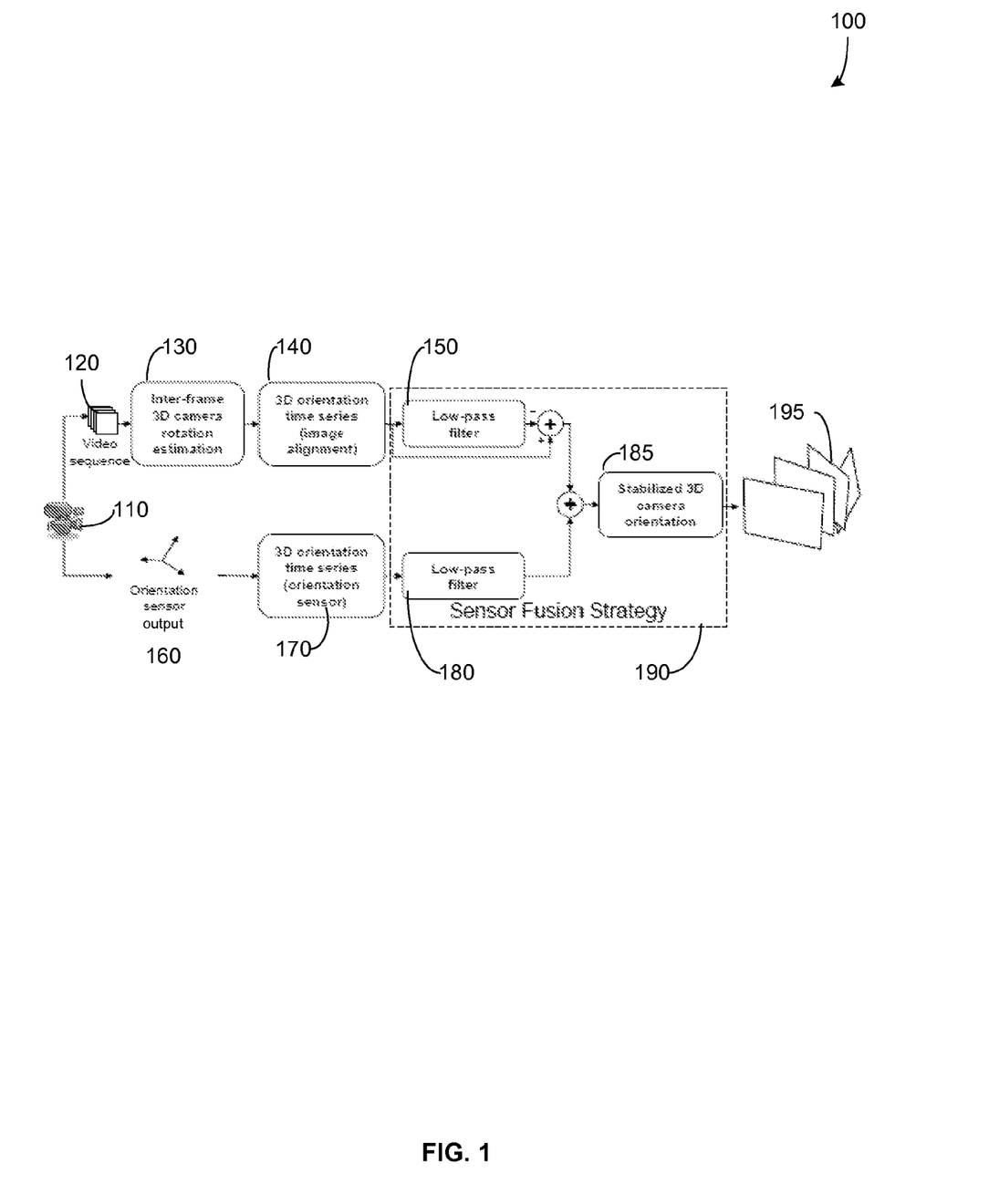
FIG. 1 is a block diagram illustrating the architecture of an embodiment.

The overall architecture is shown in FIG. 1, according to an embodiment. A video camera 110 is shown. Camera 110 may output a digital video sequence 120. A rotation estimation module 130 may estimate camera rotation by calculating a displacement between two successive frames. This may be performed for every pair of successive frames. The resultant displacements may be passed to image alignment module 140. This module may generate an orientation time series that corresponds to the sequence of aligned images. This orientation time series may then be passed to a filter 150. In the illustrated embodiment, this orientation time series is passed through a low pass filter, the output of which may be subtracted from the orientation time series. The net effect of this arrangement is to perform a high pass filtering operation on the orientation time series. In an alternative embodiment, a high pass filter may be used.

Video camera 110 may also include an orientation sensor (not shown). The orientation sensor may include one or more of an accelerometer, a compass, and a gyroscope, for example. The output from the orientation sensor is shown as output 160. This output may then be processed by module 170 to produce a time series that reflects the changes in the orientation of camera 110 over time. This time series from module 170 may then be passed to low pass filter 180. The outputs from the two filters may then be combined, or fused, to produce a stabilized 3-D camera orientation 185. Stabilized orientation 185 can then be used to produce an output video sequence 195. Note that in an embodiment, filters 150 and 180 and module 185 may be physically or logically combined in a sensor fusion module 190.

As will be discussed further below, modules 130, 140, 150, 170, 180, and 190 may be implemented in software, firmware, or hardware, or in some combination thereof.

Figure 2:
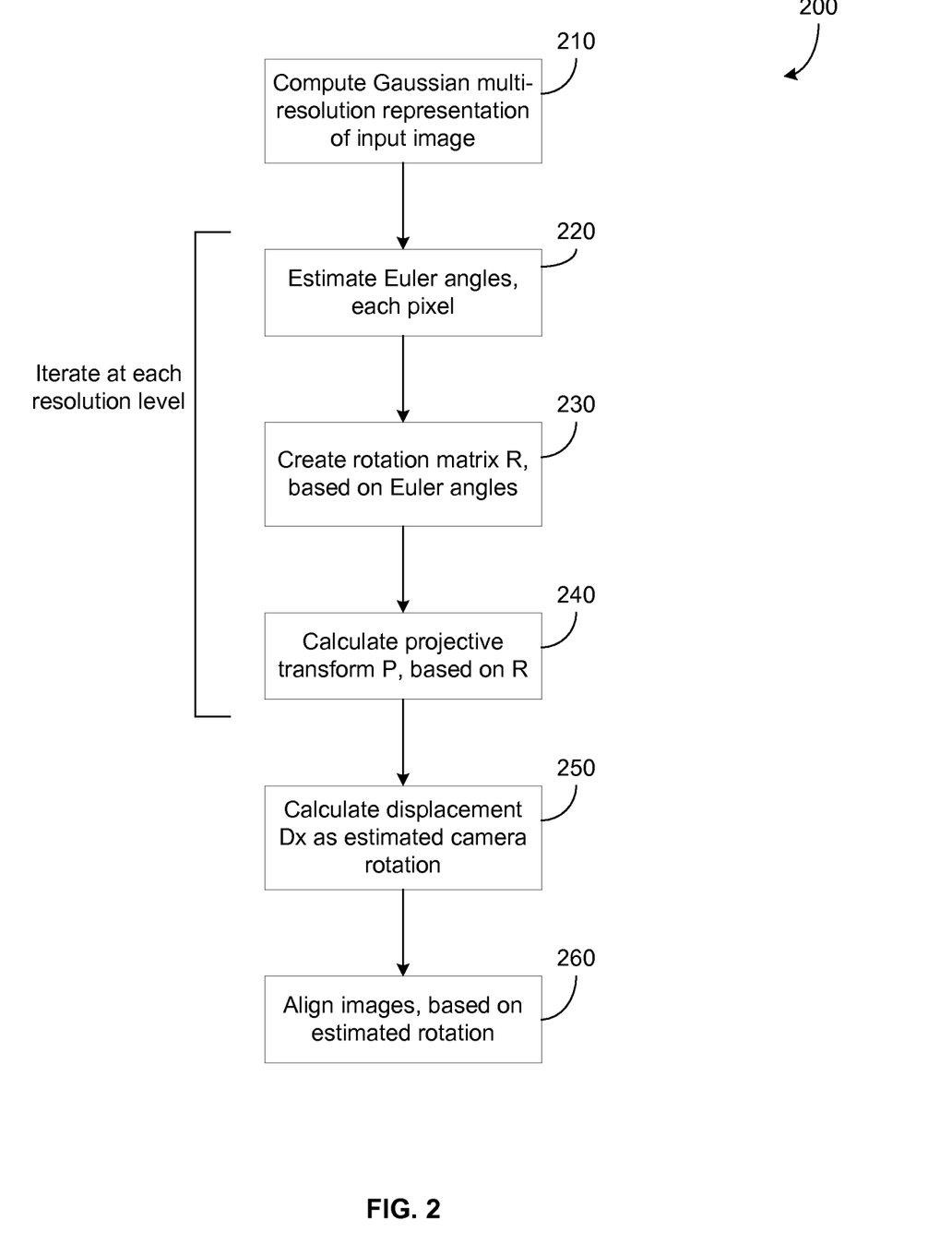
FIG. 2 is a flow chart illustrating a rotation estimation and alignment process, according to an embodiment.

A process for estimation of rotation and image alignment is illustrated in FIG. 2, according to an embodiment. At 210, a Gaussian multi-resolution representation (MRR) of an input image may be calculated. Conceptually, such a representation may be viewed as a pyramid structure, wherein a first representation or pyramid layer may be a relatively coarse representation of the image, and each succeeding representation may be a finer representation of the image relative to the previous representation. This multi-resolution representation of an image may allow for a coarse-to-fine estimation strategy. In an embodiment, this multi-resolution representation of the input image may be computed using a binomial $B_2$ filter (¼, ½, ¼) for purposes of computational efficiency.

In the embodiment of FIG. 2, the sequence 220 through 240 may be performed for each level of the pyramid, beginning at the coarsest level. Generally, the process may be based on a gradient constraint, which assumes that the intensities between two images being aligned (or registered) are displaced on a pixel by pixel basis, while their intensity values are conserved. The gradient constraint may be stated as $$d_x(p)I_x(x)+d_y(p)I_y(x)+\Delta I(p)=0 \quad (1)$$

where I represents image intensity, d represents displacement, and $\Delta I(p)=I_2(p)-I_1(p)$, where $I_2(p)$ and $I_1(p)$ are the image intensities at pixel p.

Each pixel in the image may contribute one constraint and, in general, two unknowns. However, it may be assumed that camera rotation jitter may be dominating the image motion over the camera translation so that the displacement between two images can be expressed as $$d(p) = \begin{pmatrix} \frac{x_{2_x}}{x_{2_z}} - x_{1_x} \\ \frac{x_{2_y}}{x_{2_z}} - x_{1_y} \end{pmatrix},$$

where $x_1$ is the location of pixel p in homogeneous image coordinates, $x_2=Px_1$ and boldface P is a particular projective transform that depends on three parameters describing the 3D camera rotation and the two focal lengths of the images (assuming a simple diagonal camera calibration matrix):

$$x_2 = Px_1, P = \begin{pmatrix} f_1 & 0 & 0 \\ 0 & f_1 & 0 \\ 0 & 0 & 1 \end{pmatrix} R \begin{pmatrix} 1/f_2 & 0 & 0 \\ 0 & 1/f_2 & 0 \\ 0 & 0 & 1 \end{pmatrix} \quad (2)$$

where $f_1$ and $f_2$ are the respective focal lengths, and R is the 3D rotation matrix corresponding to the camera rotation. The rotation matrix may be parametrized using Euler angles $\omega=(\omega_x, \omega_y, \omega_z)$ corresponding to an (x, y, z) convention. A small angle approximation may be used, $$R \approx \begin{pmatrix} 1 & -\omega_z & \omega_y \\ \omega_z & 1 & -\omega_x \\ -\omega_y & \omega_x & 1 \end{pmatrix} \quad (3)$$

When combining (1), (2), and (3), the following constraint may be obtained at each pixel:

$$\omega_x\left[-I_x\frac{xy}{f_2} - I_y\left(f_1 + \frac{y^2}{f_2}\right) + \Delta I\frac{y}{f_2}\right] + \omega_y\left[I_x\left(f_1 + \frac{x^2}{f_2}\right) + I_y\frac{xy}{f_2} - \Delta I\frac{x}{f_2}\right] + \omega_z\left[\frac{f1}{f2}(-I_xy + I_yx)\right] + \left(\frac{f1}{f2} - 1\right)(I_xx + I_yy) + \Delta I = 0 \quad (4)$$

Assuming that the focal lengths of both images are provided by the camera, this constraint is linear in the Euler angles vector ω.

At 220, each iteration may begin by gathering constraints from a sampling of pixels from a first input image. The locations from which the constraints are formed may be chosen using a rectangular sampling grid in the frame of reference of the first input image, according to an embodiment. Given these pixels and their constraints, a vector ω may be estimated for each pixel. The process for estimating these angles, according to an embodiment, will be discussed in greater detail below.

Given the resulting estimations of the Euler angles, at 230 a rotation matrix R may be determined according to (3) above. After this matrix is determined, at 240 the projective transform P may be calculated according to (2) above. With each iteration, the transform P may be combined with the transform P that resulted from the previous iteration, i.e., from the previous resolution level.

At 250, the displacement d(p) may be calculated as the estimated interframe camera rotation. At 260, the input frame and its succeeding frame may be aligned according to the estimated camera rotation. In an embodiment, bilinear interpolation may be used to obtain the displaced intensity values of the succeeding image at the identified pixel locations.

In an embodiment, it may be desirable to avoid problems caused by sudden changes in exposure. Such problems are sometimes introduced by the auto-exposure feature of cameras. To avoid such problems, the images may be pre-processed to equalize their mean and standard deviation prior to the alignment.

Figure 3:
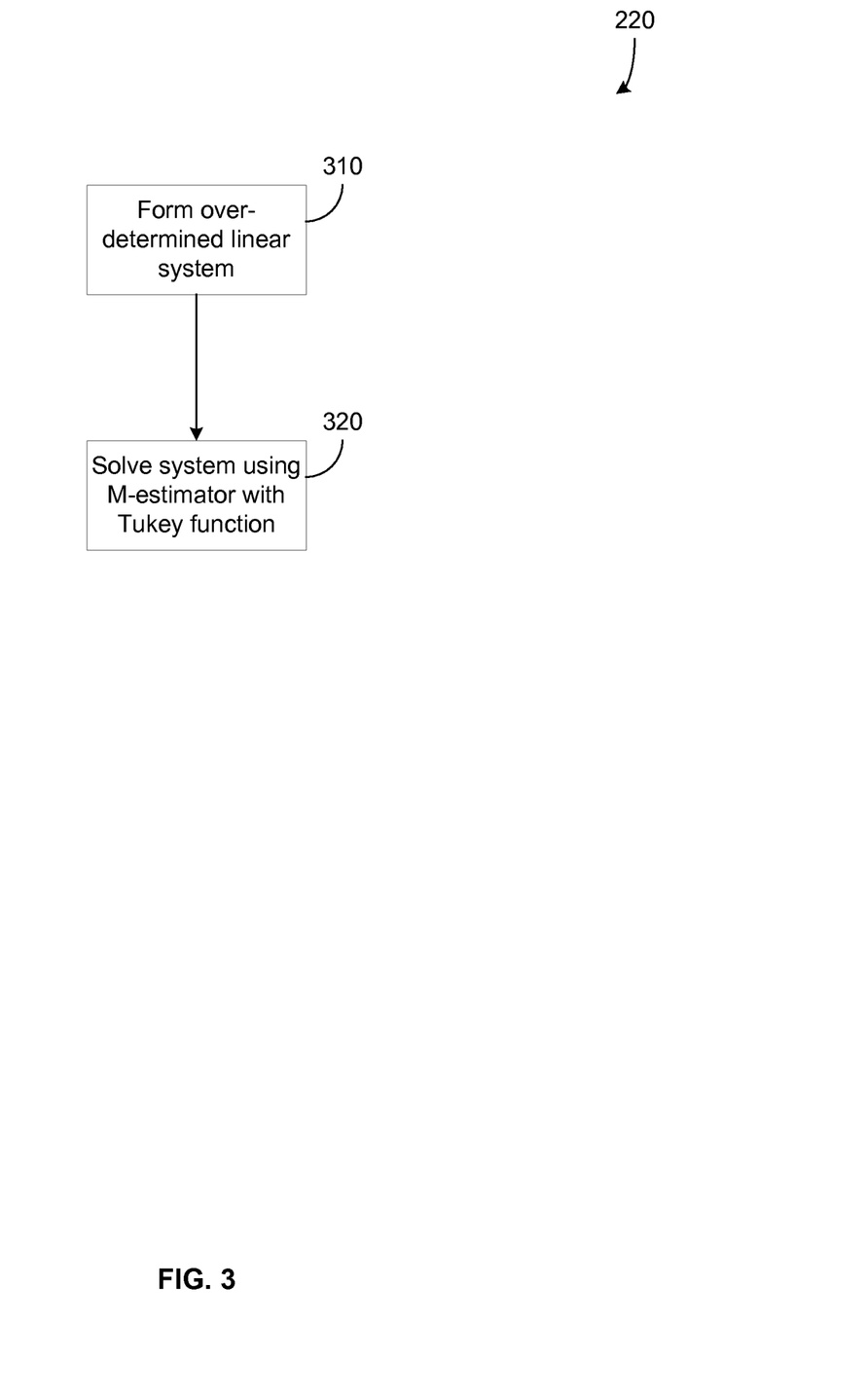
FIG. 3 is a flow chart illustrating the estimation of Euler angles, according to an embodiment.

FIG. 3 illustrates the estimation of Euler angles (220 above) in greater detail. At 310, a constraint of the form of equation (4) may be created for each sampled pixel at the given resolution level. This results in an equation for each sampled pixel. The resulting set of equations represents an over-determined system of equations that are each linear in a). At 320, this system of equations may be solved. In the illustrated embodiment, the system may be solved using an M-estimator with a Tukey function.

Figure 4:
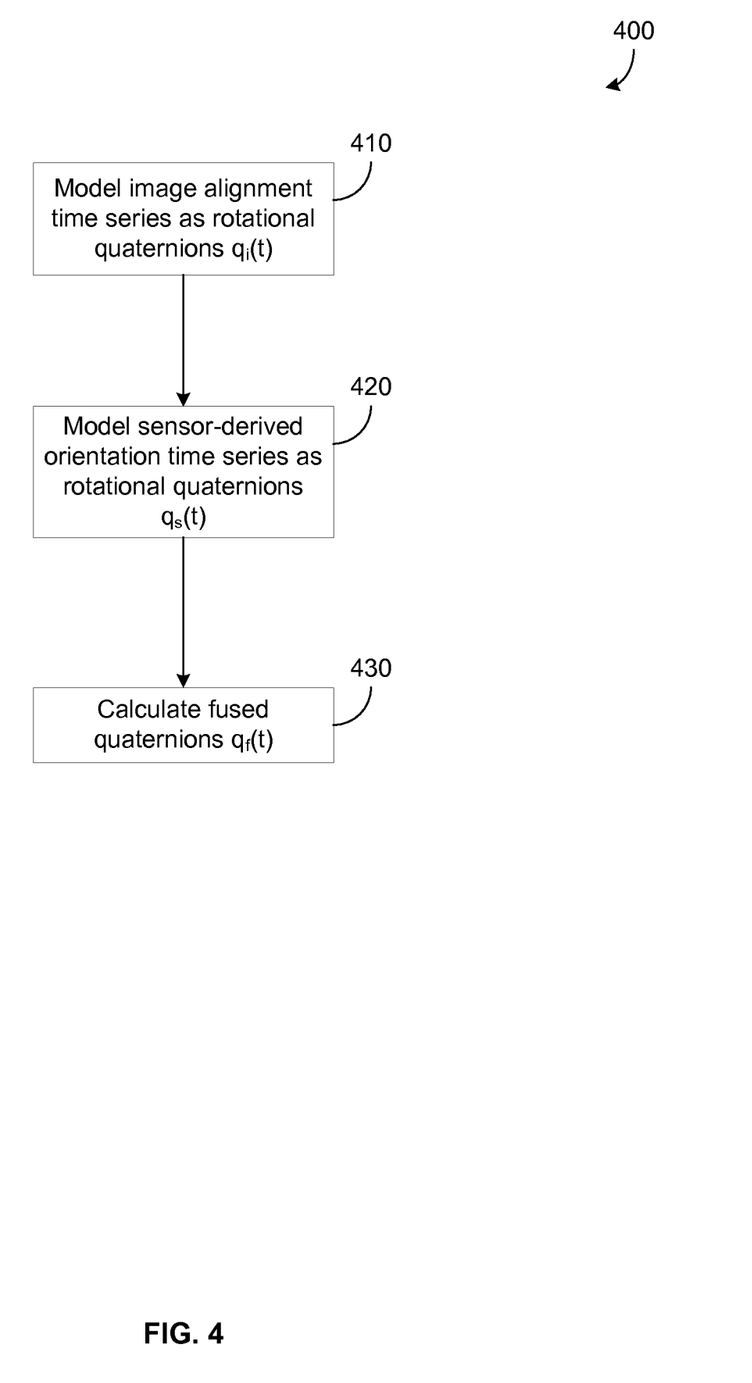
FIG. 4 is a flow chart illustrating the use of quaternions in a fusing process, according to an embodiment.

FIG. 4 illustrates the fusing of orientation information derived from the orientation sensor(s) with aligned image information. At 410, a time series representing the aligned image information may be modeled as rotational quaternions $q_i(t)$. At 420, a time series representing the orientation information derived from the orientation sensor(s) may be modeled as quaternions $q_s(t)$. The appropriate filtering may be performed on the quaternions $q_s(t)$ and $q_i(t)$ in calculation of fused quaternions $q_f(t)$, as indicated in equation 5 below.

$$q_f(t) = \frac{(q_s * g)(t) + (q_i * (\delta - g))(t)}{\|(q_s * g)(t) + (q_i * (\delta - g))(t)\|} \quad (5)$$

Here, $q_i(t)$, $q_s(t)$, and $q_f(t)$ are the aligned image, orientation, and fused quaternions respectively. g(t) is a low pass filter; the convolutional operator * denotes convolving each of the components of the quaternion with the convolutional kernel; and ‖ is the quaternion norm.

Note that in different embodiments, different low pass filters may be used. A particular low pass filter may be chosen based on the particular sensor characteristics, for example. In an embodiment, a Gaussian low pass filter with a standard deviation of σ=0.5 s may be used, for example.

Moreover, in an embodiment, convolution may be implemented using a discrete convolution mask with the number of taps equal to $$2\lfloor \sigma f_r \rfloor + 1$$

where $f_r$ is the frame rate of the video which may be equal to the sampling frequency of the orientation time series.

In an embodiment, after filtering and adding the quaternions from both sources, the resulting quaternions may not represent proper 3D rotations and may be re-normalized to the unit norm.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a non-transitory computer readable medium having computer program logic stored therein to cause a computer system to perform one or more features and/or combinations of features disclosed herein.

Figure 5:
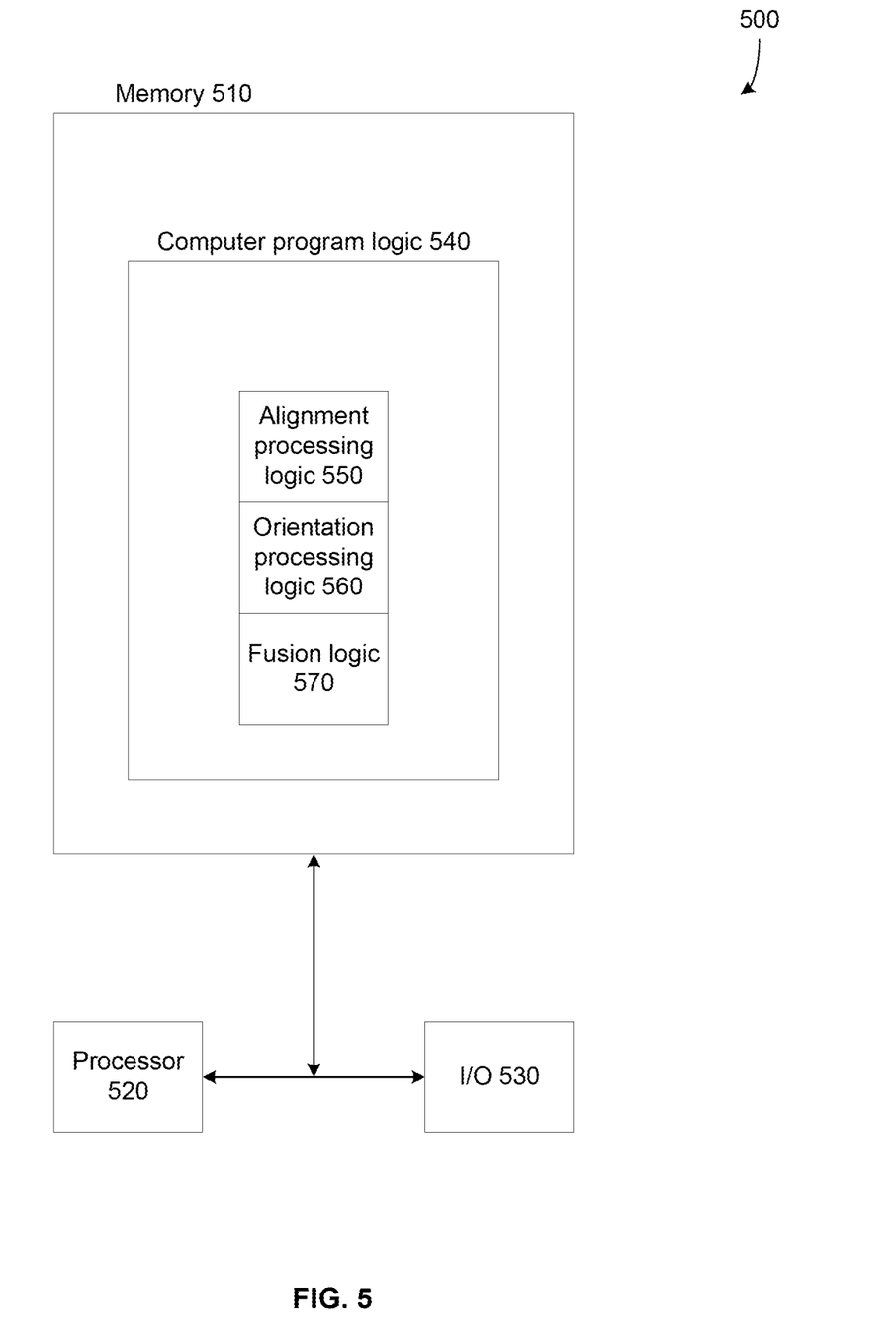
FIG. 5 is a block diagram of an exemplary computer environment, in which a software or firmware embodiment may execute, according to an embodiment.

A software or firmware embodiment of the processing described herein is illustrated in FIG. 5. In this figure, system 500 may include a processor 520 and a body of memory 510 that may include one or more computer readable media that may store computer program logic 540. Memory 510 may be implemented as a hard disk and drive, a removable media such as a compact disk, a read-only memory (ROM) or random access memory (RAM) device, for example, or some combination thereof. Processor 520 and memory 510 may be in communication using any of several technologies known to one of ordinary skill in the art, such as a bus. Computer program logic 540 contained in memory 510 may be read and executed by processor 520. One or more I/O ports and/or I/O devices, shown collectively as I/O 530, may also be connected to processor 520 and memory 510.

Computer program logic 540 may include alignment processing logic 550. This logic may be responsible for performing the processing illustrated in FIGS. 2 and 3, for example. Logic 550 may therefore include, for example, logic for the computation of Gaussian multi-resolution representations of input images. Logic 550 may also include logic for the estimation of Euler angles, the determination of a rotation matrix R, and the determination of a projective transform P. Logic 550 may also include logic for the calculation of the displacement d(x), resulting in an aligned image time series.

Computer program logic 540 may also comprise orientation processing logic 560. Logic 560 may be responsible for processing the output of an orientation sensor, and generating a corresponding orientation time series.

Computer program logic 540 may also comprise fusion logic 570. Logic 570 may be responsible for performing the filtering of the orientation time series and the aligned image time series, modeling this information as quaternions, and calculating the fused quaternions.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
receiving output from an orientation sensor of a video camera;
formatting the output from the orientation sensor as an orientation time series;
applying a low pass filter to the orientation time series to produce filtered orientation information;
receiving a video sequence from the video camera;
estimating interframe three-dimensional (3D) camera rotation for the video sequence;
aligning successive images of the video sequence using the estimated camera rotation;
formatting the aligned images as an aligned image time series;
applying a high pass filter to the aligned image time series, to produce filtered aligned image information; and
combining the filtered aligned image information with the filtered orientation information to produce a stabilized video sequence,
wherein the above are performed using a suitably programmed processor, and wherein said estimating comprises:
computing a Gaussian multi-resolution representation (MRR) of a first of the successive images;
for each level of the MRR, proceeding from coarse to fine levels, performing an iteration of the following sequence:
for each of a plurality of pixels at location x, y in the first image, defining a constraint $$\omega_x\left[-I_x\frac{xy}{f_2} - I_y\left(f_1 + \frac{y^2}{f_2}\right) + \Delta I\frac{y}{f_2}\right] + \omega_y\left[I_x\left(f_1 + \frac{x^2}{f_2}\right) + I_y\frac{xy}{f_2} - \Delta I\frac{x}{f_2}\right] + \omega_z\left[\frac{f_1}{f_2}(-I_xy + I_yx)\right] + \left(\frac{f_1}{f_2} - 1\right)(I_xx + I_yy) + \Delta I = 0$$

where $I_x$ and $I_y$ respectively represent changes in pixel intensity I in x and y directions,
thereby forming an over-determined linear system;
solving the system to estimate the vector $\omega = (\omega_x, \omega_y, \omega_z)$;
creating a rotational matrix R, $$R \approx \begin{pmatrix} 1 & -\omega_z & \omega_y \\ \omega_z & 1 & -\omega_x \\ -\omega_y & \omega_x & 1 \end{pmatrix};$$

using R, calculating a projection transform P, $$P = \begin{pmatrix} f_1 & 0 & 0 \\ 0 & f_1 & 0 \\ 0 & 0 & 1 \end{pmatrix} R \begin{pmatrix} 1/f_2 & 0 & 0 \\ 0 & 1/f_2 & 0 \\ 0 & 0 & 1 \end{pmatrix}$$

where $f_1$ and $f_2$ are respective focal lengths; and
combining P with a projection transform from the previous iteration, to create a projection transform of the current iteration; and
using a final projection transform P to calculate a displacement d(x).

2. The method of claim 1, wherein said solving of the over-determined linear system comprises solving the system using a robust M-estimator with a Tukey function using an iterative re-weighted least squares strategy.

3. The method of claim 1, wherein said computing of the Gaussian MRR comprises using a binomial filter for said computing.

4. The method of claim 1, wherein the plurality of pixels are located in a rectangular sampling grid in the first image.

5. The method of claim 1, wherein said alignment of the successive images is performed using bilinear interpolation.

6. The method of claim 1, wherein the orientation time series and the aligned image time series are represented as quaternions.

7. The method of claim 6 wherein the low pass filter comprises a Gaussian low pass filter with a standard deviation $\sigma=0.5$ seconds.

8. The method of claim 6, wherein said combining of the filtered aligned image information and the filtered orientation information comprises generation of a fused quaternion based on convolution, wherein said convolution uses a discrete convolution mask.

9. The method of claim 1, further comprising:
pre-processing the successive images to equalize, between the images, the mean and standard deviations of the intensities of the images.

10. A system, comprising:
a processor;
a memory in communication with said processor, said memory for storing a plurality of processing instructions for directing said processor to:
receive output from an orientation sensor of a video camera;
format the output from the orientation sensor as an orientation time series;
apply a low pass filter to the orientation time series to produce filtered orientation information;
receive a video sequence from the video camera;
estimate interframe three-dimensional (3D) camera rotation for the video sequence;
align successive images of the video sequence using the estimated camera rotation;
format the aligned images as an aligned image time series;
apply a high pass filter to the aligned image time series, to produce filtered aligned image information;
combine the filtered aligned image information with the filtered orientation information to produce a stabilized video sequence, and wherein said estimating comprises:
computing a Gaussian multi-resolution representation (MRR) of a first of the successive images;
for each level of the MRR, proceeding from coarse to fine levels, performing an iteration of the following sequence:
for each of a plurality of pixels at location x, y in the first image, defining a constraint $$\omega_x\left[-I_x\frac{xy}{f_2}-I_y\left(f_1+\frac{y^2}{f_2}\right)+\Delta I\frac{y}{f_2}\right]+\omega_y\left[I_x\left(f_1+\frac{x^2}{f_2}\right)+I_y\frac{xy}{f_2}-\Delta I\frac{x}{f_2}\right]+$$
$$\omega_z\left[\frac{f_1}{f_2}(-I_xy+I_yx)\right]+\left(\frac{f_1}{f_2}-1\right)(I_xx+I_yy)+\Delta I=0$$

where $I_x$ and $I_y$ respectively represent changes in pixel intensity I in x and y directions,
thereby forming an over-determined linear system;
solving the system to estimate the vector $\omega=(\omega_x, \omega_y, \omega_z)$;

creating a rotational matrix R, $$R \approx \begin{pmatrix} 1 & -\omega_z & \omega_y \\ \omega_z & 1 & -\omega_x \\ -\omega_y & \omega_x & 1 \end{pmatrix};$$

using R, calculating a projection transform P, $$P = \begin{pmatrix} f_1 & 0 & 0 \\ 0 & f_1 & 0 \\ 0 & 0 & 1 \end{pmatrix} R \begin{pmatrix} 1/f_2 & 0 & 0 \\ 0 & 1/f_2 & 0 \\ 0 & 0 & 1 \end{pmatrix}$$

where $f_1$ and $f_2$ are respective focal lengths; and
combining P with a projection transform from the previous iteration, to create a projection transform of the current iteration; and
using a final projection transform P to calculate a displacement d(x).

11. The system of claim 10, wherein said processing instructions for directing said processor to solve the over-determined linear system comprises processing instructions for directing said processor to:
solve the system using a robust M-estimator with a Tukey function using an iterative re-weighted least squares strategy.

12. The system of claim 10, wherein said processing instructions for directing said processor to compute the Gaussian MRR comprises processing instructions for directing said processor to use a binomial filter for said computing.

13. The system of claim 10, wherein the plurality of pixels are located in a rectangular sampling grid in the first image.

14. The system of claim 10, wherein said processing instructions for directing said processor to align the successive images comprises processing instructions for directing said processor to perform the alignment using bilinear interpolation.

15. The system of claim 10, wherein the orientation time series and the aligned image time series are represented as quaternions.

16. The system of claim 15 wherein the low pass filter comprises a Gaussian low pass filter with a standard deviation $\sigma=0.5$ seconds.

17. The system of claim 15, wherein said processing instructions for directing said processor to combine the filtered aligned image information and the filtered orientation information comprises processing instructions for directing said processor to generate a fused quaternion based on convolution, wherein said convolution uses a discrete convolution mask.

18. The system of claim 10, wherein said plurality of processing instructions further comprises instructions directing said processor to:
pre-process the successive images to equalize, between the images, the mean and standard deviations of the intensities of the images.

19. A computer program product comprising a non-transitory computer usable medium having computer program logic stored thereon, the computer control logic comprising:
logic configured to cause a processor to receive output from an orientation sensor of a video camera;
logic configured to cause the processor to format the output from the orientation sensor as an orientation time series;
logic configured to cause a processor to apply a low pass filter to the orientation time series to produce filtered orientation information;

logic configured to cause a processor to receive a video sequence from the video camera;

logic configured to cause a processor to estimate inter-frame three-dimensional (3D) camera rotation for the video sequence;

logic configured to cause a processor to align successive images of the video sequence using the estimated camera rotation;

logic configured to cause a processor to format the aligned images as an aligned image time series;

logic configured to cause a processor to apply a high pass filter to the aligned image time series, to produce filtered aligned image information;

logic configured to cause a processor to combine the filtered aligned image information with the filtered orientation information to produce a stabilized video sequence, and wherein said estimating comprises:

computing a Gaussian multi-resolution representation (MRR) of a first of the successive images;

for each level of the MRR, proceeding from coarse to fine levels, performing an iteration of the following sequence:

for each of a plurality of pixels at location x, y in the first image, defining a constraint $$\omega_x\left[-I_x\frac{xy}{f_2} - I_y\left(f_1 + \frac{y^2}{f_2}\right) + \Delta I\frac{y}{f_2}\right] + \omega_y\left[I_x\left(f_1 + \frac{x^2}{f_2}\right) + I_y\frac{xy}{f_2} - \Delta I\frac{x}{f_2}\right] +$$
$$\omega_z\left[\frac{f_1}{f_2}(-I_xy + I_yx)\right] + \left(\frac{f_1}{f_2} - 1\right)(I_xx + I_yy) + \Delta I = 0$$

where $I_x$ and $I_y$ respectively represent changes in pixel intensity I in x and y directions, thereby forming an over-determined linear system;

solving the system to estimate the vector $\omega=(\omega_x, \omega_y, \omega_z)$;

creating a rotational matrix R, $$R \approx \begin{pmatrix} 1 & -\omega_z & \omega_y \\ \omega_z & 1 & -\omega_x \\ -\omega_y & \omega_x & 1 \end{pmatrix};$$

using R, calculating a projection transform P, $$P = \begin{pmatrix} f_1 & 0 & 0 \\ 0 & f_1 & 0 \\ 0 & 0 & 1 \end{pmatrix} R \begin{pmatrix} 1/f_2 & 0 & 0 \\ 0 & 1/f_2 & 0 \\ 0 & 0 & 1 \end{pmatrix}$$

where $f_1$ and $f_2$ are respective focal lengths; and combining P with a projection transform from the previous iteration, to create a projection transform of the current iteration; and using a final projection transform P to calculate a displacement d(x).

20. The computer program product of claim 19, wherein the computer control logic further comprises:

logic configured to cause the processor to solve the over-determined linear system using a robust M-estimator with a Tukey function using an iterative re-weighted least squares strategy.

21. The computer program product of claim 19, wherein the computer control logic configured to cause the processor to compute the Gaussian MRR comprises:

logic configured to cause the processor to use a binomial filter for the computing of the Gaussian MRR.

22. The computer program product of claim 19, wherein the plurality of pixels are located in a rectangular sampling grid in the first image.

23. The computer program product of claim 19, wherein the computer control logic configured to cause the processor to align the successive images comprises:

logic configured to cause the processor to perform the alignment using bilinear interpolation.

24. The computer program product of claim 19, wherein the orientation time series and the aligned image time series are represented as quaternions.

25. The computer program product of claim 24, wherein the low pass filter comprises a Gaussian low pass filter with a standard deviation $\sigma=0.5$ seconds.

26. The computer program product of claim 24, wherein the computer control logic configured to cause the processor to combine the filtered aligned image information and the filtered orientation information comprises:

logic configured to cause the processor to generate a fused quaternion based on convolution, wherein said convolution uses a discrete convolution mask.

27. The computer program product of claim 19, wherein the computer control logic further comprises:

logic configured to cause the processor to pre-process the successive images to equalize, between the images, the mean and standard deviations of the intensities of the images.

\* \* \* \* \*